United States Patent [19]
Koizumi

[11] Patent Number: 5,452,025
[45] Date of Patent: Sep. 19, 1995

[54] TELEVISION SET WITH SOUND-REFLECTING SIDEWALLS

[75] Inventor: Hiroshi Koizumi, Saitama, Japan

[73] Assignee: Sony Corporation, Tokyo, Japan

[21] Appl. No.: 942,771

[22] Filed: Sep. 10, 1992

[30] Foreign Application Priority Data

Sep. 10, 1991 [JP] Japan .................. 3-258436

[51] Int. Cl.[6] .......................................... H04N 5/64
[52] U.S. Cl. ...................... 348/805; 348/836; 381/88; 381/90
[58] Field of Search ............ 348/787, 789, 794, 805, 348/836, 843; 381/24, 88, 87, 89, 90; 312/7.2; H04N 5/64

[56] References Cited

U.S. PATENT DOCUMENTS

| Re. 31,228 | 5/1983 | Bose | 381/90 |
|---|---|---|---|
| 3,557,324 | 1/1971 | Nakamatsu | 348/836 |
| 5,119,429 | 6/1992 | Chatelain | 381/90 |
| 5,274,709 | 12/1993 | Koizuma | 381/88 |

FOREIGN PATENT DOCUMENTS 0462571 12/1991 European Pat. Off. ....... H04N 5/64

2257798 10/1990 Japan ..................... H04R 5/02

Primary Examiner—James J. Groody
Assistant Examiner—Jeffrey S. Murrell
Attorney, Agent, or Firm—Jay H. Maioli

[57] ABSTRACT

A television set has a cabinet, a cathode-ray tube and first and second speakers having respectively first and second centerlines. The cabinet is formed with first and second sound-reflecting sidewall portions and with first and second open portions facilitating egress of sound from the speakers to the exterior of the cabinet. The speakers are mounted adjacent to the first and second sidewalls, respectively, near the neck portion of the cathode-ray tube and are oriented so that the first and second centerlines intersect the first and second sound-reflecting sidewall portions at first and second points and at first and second angles of incidence. First and second lines passing through the first and second points and oriented in accordance with first and second angles of reflection respectively equal to the first and second angles of incidence pass through the first and second open portions and converge towards a point in front of the television set.

20 Claims, 2 Drawing Sheets

TELEVISION SET WITH SOUND-REFLECTING SIDEWALLS

BACKGROUND OF THE INVENTION

1. Field of the Invention

The present invention relates to a television set having a cabinet incorporating a cathode-ray tube or Braun tube and one or more speakers. More particularly, the invention relates to such apparatus for use in situations where it is desired to have superior sound quality but where space for accommodating a TV cabinet is limited.

2. Description of the Prior Art

FIG. 4 shows an example of a typical prior art television set. As that figure shows, a cabinet 1 incorporates a cathode-ray tube 2 and speaker boxes 4 each thereof housing a speaker 3. The cathode-ray tube 2 is disposed in the center of the cabinet 1, and the speaker boxes 4 are fixed to sidewalls of the cabinet 1 on either side of the cathode-ray tube 2. The fluorescent screen of the cathode-ray tube 2 and the acoustic outlets of the speakers 3 are located in an opening at the front of the cabinet 1.

FIG. 5 shows another example of a typical prior art television set. In this television set, the speaker boxes 4 are disposed on either side of the neck, base or rear portion of the cathode-ray tube 2, and each speaker 3 communicates with the front opening 5 of the cabinet 1 via a channel forming an acoustic path 6.

In the prior art example of FIG. 4, since the speaker boxes 4 are disposed on either side of the display screen of the cathode-ray tube 2, the width of -the cabinet 1, i.e., its dimension in a lateral or left-to-right direction, is increased by the lateral dimensions of the two speaker boxes 4. If the width of the cabinet 1 is limited, for example because there is only limited space to accommodate the cabinet 1, it is impossible, in the conventional structure illustrated in FIG. 4, to provide both a large viewing screen and large speakers.

In the case of the prior art example shown in FIG. 5, there is the problem that the quality of the sound deteriorates because of the effect of the relatively long, narrow, and tortuous channels defining the acoustic paths 6. These acoustic paths 6 give rise to a peculiar and unsatisfactory frequency response of the sound waves respectively passing through them.

OBJECTS AND SUMMARY OF THE INVENTION

An object of the present invention is to provide a remedy for the problems of the prior art outlined above and in particular to provide a television set that on the one hand is capable of housing large speakers and giving an improved quality of sound and that on the other hand has a width that is not excessive, an external appearance that is quite handsome, and a design by virtue of which it is very economical to manufacture and ship.

The present invention is characterized in that, in a television set having a cabinet incorporating a cathode-ray tube and speakers, the inner surface at the front of each sidewall of the cabinet is constructed to serve as a reflecting plate for reflecting the sound emitted from the speaker, the reflecting plate being positioned on the centerline of the speaker.

More particularly, in accordance with one aspect of the invention, there is provided a speaker apparatus comprising a speaker unit generating a sound wave from an electric signal and a reflecting member disposed on an extensions of a central axes of the speaker unit.

In accordance with an independent aspect of the invention, there is provided speaker apparatus for stereophonic reproduction, the speaker apparatus comprising two speaker units generating left and right sound waves respectively disposed symmetrically with respect to a predetermined plane and two reflecting members for reflecting the left and right sound waves respectively disposed symmetrically with respect to the predetermined plane on extensions of center axes of the two speaker units respectively.

In accordance with another independent aspect of the invention, a stereophonic sound reproducing apparatus is provided comprising two speaker units generating left and right sound waves respectively disposed symmetrically with respect to a predetermined plane, two reflecting members for reflecting the left and right sound waves respectively disposed symmetrically with respect to the predetermined plane on extensions of center axes of the two speaker units respectively, an electric circuit for processing electric signals for supplying stereophonic signals to the two speaker units, and a cabinet including the two speaker units, the two reflecting members, and the electric circuit.

In accordance with other independent aspects of the invention, the invention is applied specifically to a television receiver including a monaural or a stereophonic sound system.

From still another standpoint, the invention comprises a television set comprising a cabinet, a cathode-ray tube and a first speaker having a first centerline, the cabinet being formed with a first sound-reflecting wall portion and with a first open portion facilitating egress of sound from the first speaker to the exterior of the cabinet and the first speaker being mounted adjacent to the first wall portion and being oriented so that the first centerline intersects the first wall portion at a first point and at a first angle of incidence such that a first line passing through the first point and oriented in accordance with a first angle of reflection equal to the first angle of incidence passes through the first open portion. Preferably, a television set so constituted also comprises a second sound-reflecting wall portion and a second speaker constructed and arranged similarly to the first to provide stereophonic reproduction.

In a television set constructed in accordance with the invention, since the side plates of the cabinet serve as sound-reflecting plates and the centerlines of the speakers are arranged to intersect the respective reflecting plates, it becomes possible to dispose the speakers in the vicinity of the base portion of the cathode-ray tube, where the available space is ample, and, hence, to use large speakers while keeping the cabinet small in width. Further, it becomes possible to control the directivity of the sound so that the sounds from the two speakers can be directed to a designated location in front of the television set, thereby improving sound image localization.

BRIEF DESCRIPTION OF THE DRAWINGS

A better understanding of the objects, features and advantages of the invention can be gained from a consideration of the following detailed description of the preferred embodiments of the invention, take in conjunction with the appended figures of the drawing.

DESCRIPTION OF THE PREFERRED EMBODIMENTS

Figure 1:
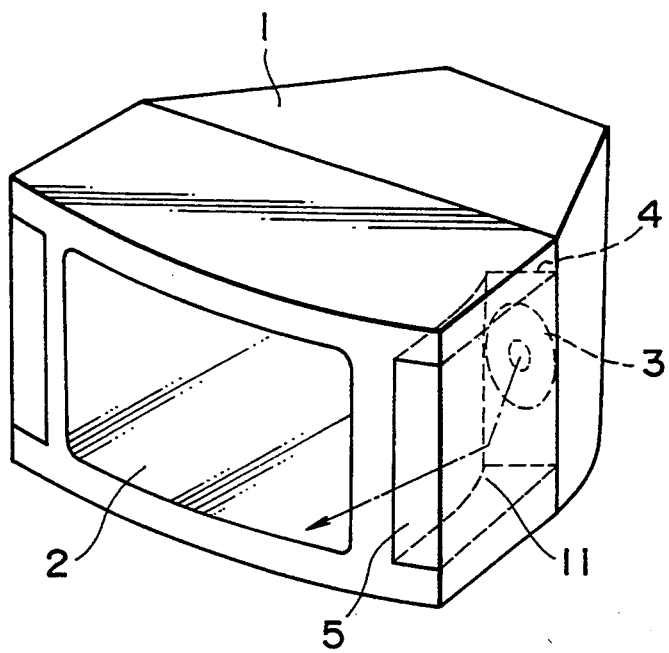
FIG. 1 is a perspective view of a preferred embodiment of a television set constructed in accordance with the present invention.
Figure 2:
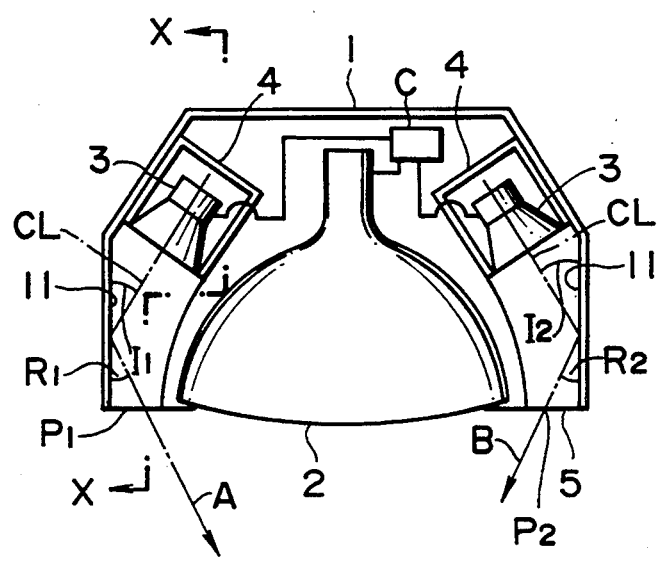
FIG. 2 is a top plan view of the apparatus of FIG. 1, the top of the apparatus being omitted in order to show the arrangement of interior components.
Figure 3:
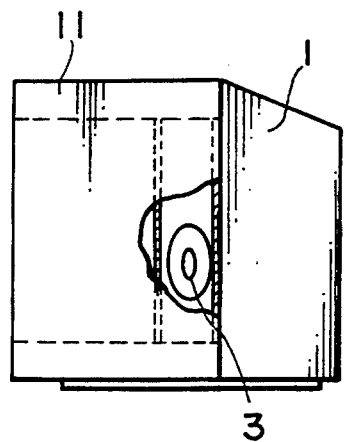
FIG. 3 is a sectional view taken along the broken line X—X in FIG. 2 and looking in the direction of the arrows.
Figure 4:
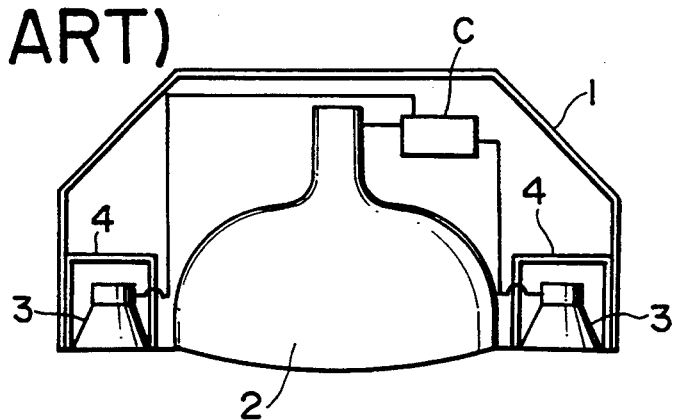
FIG. 4 is a view corresponding to FIG. 2 but showing a first conventional type of television set.
Figure 5:
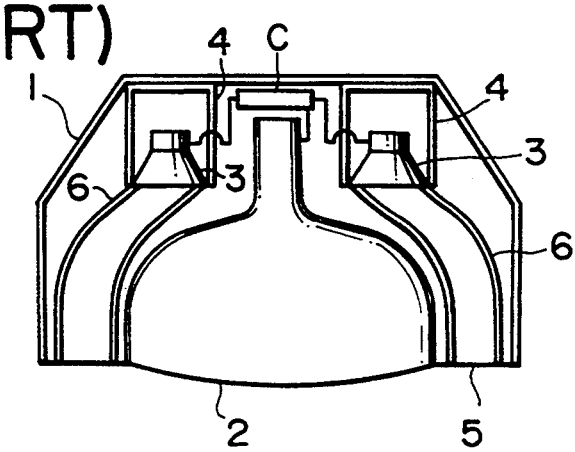
FIG. 5 is a view corresponding to FIG. 2 but showing a second conventional type of television set.

A preferred embodiment of a television set constructed in accordance with present invention is described below with reference to the accompanying drawings, particularly FIG. 1 to FIG. 3. Throughout these drawings, parts corresponding to the parts in the prior art examples shown in FIG. 4 and FIG. 5 are denoted by corresponding reference numerals, and description of those parts will be suitably omitted.

A conventional electric circuit C drives the cathode-ray tube 2 and the speakers 3 so that an image is formed on the screen of the cathode-ray tube 2 and sound waves emanate from the speakers 3. The speakers 3 are disposed symmetrically with respect to a predetermined median vertical plane lying halfway between them. In accordance with the invention, the inner faces at the front of the sidewalls of the cabinet 1 opposing each other serve as reflecting plates 11 for reflecting sounds emitted from the speakers 3. Each reflecting plate 11 functions as part of a sound horn extending forward from the front of a speaker and may be a sidewall of the cabinet 1 "as is" or a separate plate cemented or otherwise secured to the sidewall. The sound horn has front and back open portions, and the front open portion has an area that is smaller than the area of the back open portion. The reflecting plates 11 may for example be hard, nonporous, rigid, and otherwise constructed so as to absorb a minimum and reflect a maximum percentage of the energy of the impinging sound waves.

Two speaker boxes 4 are disposed one on either side of the base or neck portion of the cathode-ray tube 2, and each speaker 3 housed in its speaker box 4 is oriented so that its centerline CL (including an extension thereof) intersects the reflecting plate 11 at an angle of incidence $I_1$ or $I_2$ (which may be equal to each other or not). Thus, sound emitted from each speaker 3 and striking one of the reflecting plates 11 is reflected at an angle of reflection $R_1$ or $R_2$ and advances in the direction indicated by the arrow A or B through a respective portion $P_1$ or $P_2$ of the opening 5 at the front of the cabinet 1. The angle of incidence $I_1$ is equal to the angle of reflection $R_1$, and the angle of incidence $I_2$ is equal to the angle of reflection $R_2$. The angles $I_1$ and $R_1$ may be different from the angles $I_2$ and $R_2$ in a particular installation, but often it will be desirable for all four angles to have the same absolute value to achieve lateral symmetry with respect to a median vertical plane in a particular installation.

In accordance with the invention, since the speaker boxes 4 are disposed between the narrow base portion of the cathode-ray tube 2 and the inner faces of the cabinet 1, large speakers can be used even if there is a restriction as to the width of the cabinet 1. The use of large speakers, other factors being equal, improves the quality of the sound. Further, since the sidewalls of the cabinet 1 are used ("as is" or with suitable modification) as sound reflecting plates 11, the "directivity" of the sound (i.e., the direction of propagation of the sound wave in which the energy of the sound wave has its maximum value) can be changed merely by changing the orientation of the centerline of either speaker 3. This enables control of the directions of the sounds emanating from the two speakers so that the sounds converge towards a predetermined location somewhere in front of the television set, whereby sound image localization is considerably improved.

Furthermore, the shape of the opening 5 as seen from the front of the television set can be made oblong to give a good external appearance (in the illustrated embodiment, the opening 5 is rectangular, and its height exceeds its width by a factor of about 3 or 4). Besides, since extra parts such as structural channels defining acoustic paths are not required, the television set can be manufactured at a cost that is reduced as compared to conventional sets of the type illustrated in FIG. 5.

Although the case wherein the speakers 3 are housed in respective speaker boxes 4 has been described, the speaker 3 can of course be just a plain speaker (i.e., a speaker without a speaker box), or it can be a one-speaker set.

In accordance with the present invention as described above, since a portion of each sidewall serves as a reflector of the sound emitted from one of the speakers, it is possible to use large speakers even if there is a restriction as to the width of the cabinet. This enables a corresponding improvement in the quality of the sound. Further, it is possible to control the directivity of the sound and in that way to improve sound image localization. In addition, it is possible to make the external appearance aesthetically pleasing and yet reduce the cost of manufacture. Even the cost of shipping is reduced: a television set constructed in accordance with the invention has reduced volume and weight, since it does not require the width of the structure of FIG. 4 or the sound tubes (channels) of the structure of FIG. 5.

Thus there is provided in accordance with the invention a television set capable of incorporating large speakers for reproducing monaural or stereophonic sound and improving the quality of the sound and capable of changing the direction of sound emission. A television set constructed in accordance with the invention can be made aesthetically attractive and is economical to manufacture and ship. Many modifications of the preferred embodiments of the invention disclosed herein will readily occur to those skilled in the art. All such modifications are intended to be included within the scope of the appended claims.

We claim:

1. A speaker apparatus comprising;
    a cabinet;
    a speaker unit disposed in said cabinet for generating a sound wave from an electric signal;
    a reflecting member forming a sidewall of said cabinet and disposed on an extension of a central axis of said speaker unit, wherein the sound wave, after being reflected once by said reflecting member, goes into free space in front of the speaker apparatus; and a speaker box having an open portion and attached to a rear portion of said speaker unit.

2. A speaker apparatus according to claim 1 wherein said reflecting member is a part of a sound horn attached to a front side of said speaker unit.

3. A speaker apparatus according to claim 2 wherein said sound horn has front and back open portions and said front open portion has an area that is smaller than an area of said back open portion.

4. Speaker apparatus for stereophonic reproduction comprising:
a cabinet;
two speaker units disposed in said cabinet for generating left and right sound waves respectively disposed symmetrically with respect to a predetermined plane; and
two reflecting members forming respective left and right sidewalls of said cabinet for reflecting the left and right sound waves respectively disposed symmetrically with respect to said predetermined plane on extensions of center axes of said two speaker units respectively, wherein said left and right sound waves, after being reflected once by said reflecting members, go into free space in front of said speaker apparatus.

5. A stereophonic sound reproducing apparatus comprising:
two speaker units generating left and right sound waves respectively disposed symmetrically with respect to a predetermined plane;
two reflecting members for reflecting said left and right sound waves respectively disposed symmetrically with respect to said predetermined plane on extensions of center axes of said two speaker units respectively;
an electric circuit for processing electric signals for supplying stereophonic signals to said two speaker units; and
a cabinet including said two speaker units, said two reflecting members, and said electric circuit, wherein said two reflecting members are respectively incorporated in left and right sidewalls of said cabinet.

6. A television receiver comprising:
a cabinet;
a display member disposed in said cabinet for displaying a picture from an electric signal;
a speaker unit disposed in said cabinet for generating a sound wave from said electric signal; and
a reflecting member incorporated in a sidewall of said cabinet and disposed on an extension of a central axis of said speaker unit, wherein said sound waver after being reflected once by said reflecting member, goes into free space in front of the television receiver.

7. A television receiver according to claim 6 further comprising a speaker box having an open portion which is attached to a back portion of said speaker unit.

8. A television receiver according to claim 6 wherein said reflecting member is a part of a sound horn attached to a front side of said speaker unit.

9. A television receiver according to claim 8 wherein said sound horn has front and back open portions and said front open portion has an area that is smaller than an area of said back open portion.

10. A television receiver according to claim 6 wherein said display member is a cathode-ray tube.

11. A television receiver comprising:

a display member displaying a picture from an electric signal;
two speaker units generating left and right sound waves respectively disposed symmetrically with respect to a predetermined plane and adjacent opposing sides of said display member;
two reflecting members for reflecting said left and right sound waves respectively disposed symmetrically with respect to said predetermined plane on extensions of center axes of said two speaker units respectively;
an electric circuit for processing the electric signal and for supplying stereophonic signals to said two speaker units; and
a cabinet including said two speaker units, said two reflecting members, and said electric circuit, wherein said two reflecting members form respective left and right sidewalls of said cabinet.

12. A television receiver according to claim 11 wherein said cabinet is formed with two open portions at a front side thereof as output openings for respective passage of said sound waves after reflection by said two reflecting members.

13. A television receiver according to claim 12 wherein said two open portions are shaped substantially as rectangles.

14. A television receiver according to claim 13 wherein said two open portions have heights greater than their widths.

15. A television receiver according to claim 11 wherein said display member is a cathode-ray tube.

16. A television receiver according to claim 15 wherein said two speaker units are located near the rear of said cathode-ray tube.

17. A television receiver according to claim 16 wherein said two speaker units are oriented to direct said sound waves away from said predetermined plane prior to reflection of said sound waves by said respective reflecting members.

18. A television set comprising a cabinet formed with a pair of openings and a cathode-ray tube and a pair of speakers mounted in said cabinet, the sidewalls of said cabinet forming a pair of sound-reflecting surfaces for reflecting sounds emitted from said speakers, said speakers respectively having centerlines intersecting said sidewalls so as to reflect sounds emitted from said speakers through said respective openings to the exterior of the cabinet.

19. A television set comprising a cabinet, a cathode-ray tube and a first speaker having a first centerline, a first side wall of the cabinet forming a first sound-reflecting wall portion, the cabinet including a first open portion facilitating egress of sound from the first speaker to the exterior of the cabinet and the first speaker being mounted adjacent to the first wall portion and being oriented so that the first centerline intersects the first wall portion at a first point and at a first angle of incidence such that a first line passing through the first point and oriented in accordance with a first angle of reflection equal to said first angle of incidence passes through the first open portion.

20. A television set according to claim 19 further comprising a second speaker having a second centerline, a second side wall of the cabinet forming a second sound-reflecting wall portion, the cabinet including a second open portion facilitating egress of sound from the second speaker to the exterior of the cabinet and the second speaker being mounted adjacent to the second wall portion and being oriented so that the second centerline intersects the second wall portion at a second point and at a second angle of incidence such that a second line passing through the second point and oriented in accordance with a second angle of reflection equal to said second angle of incidence passes through the second open portion, said first and second lines converging towards a location in front of the television set.

* * * * *

UNITED STATES PATENT AND TRADEMARK OFFICE
CERTIFICATE OF CORRECTION

PATENT NO. : 5,452,025
DATED : September 19, 1996
INVENTOR(S) : Hiroshi Koizumi

It is certified that error appears in the above-indentified patent and that said Letters Patent is hereby corrected as shown below:

Col. 1, line 33, change "-the" to --the--

Col. 5, line 52, change "waver" to --wave,--

Signed and Sealed this

Fifth Day of November, 1996

Attest:

BRUCE LEHMAN

*Attesting Officer*     *Commissioner of Patents and Trademarks*